United States Patent
Jacobs

(10) Patent No.: US 7,373,735 B2
(45) Date of Patent: May 20, 2008

(54) DEVICE AND METHOD FOR RAPID HARDWARE SIZING

(76) Inventor: Todd M. Jacobs, 20247 Polk St. Northwest, Elk River, MN (US) 55330

( * ) Notice: Subject to any disclaimer, the term of this patent is extended or adjusted under 35 U.S.C. 154(b) by 0 days.

(21) Appl. No.: 11/473,792

(22) Filed: Jun. 24, 2006

(65) Prior Publication Data
US 2007/0294904 A1    Dec. 27, 2007

(51) Int. Cl.
*G01B 5/00* (2006.01)
(52) U.S. Cl. ............... 33/679.1; 33/783; 33/784; 81/159; 81/165
(58) Field of Classification Search ............... 33/679.1, 33/783, 784, 793–796, 810, 811, 813, 819, 33/820, 823, 558.01, 558.02, 555.1, 555.2, 33/555.3, 806, 787; 81/159, 165, 167, 368, 81/126, DIG. 5; 702/155, 157, 158, 161
See application file for complete search history.

(56) References Cited

U.S. PATENT DOCUMENTS

| | | | |
|---|---|---|---|
| 4,229,883 A | 10/1980 | Kobashi | |
| 4,375,722 A | 3/1983 | Nishikata et al. | |
| 4,419,824 A | 12/1983 | Oberhans | |
| 4,578,868 A | 4/1986 | Sasaki et al. | |
| 4,745,685 A * | 5/1988 | Castillo | 33/199 R |
| 4,843,721 A * | 7/1989 | Hoge | 33/802 |
| 4,845,646 A | 7/1989 | Marquis et al. | |
| 4,908,955 A * | 3/1990 | Nicholson | 33/808 |
| 4,941,267 A | 7/1990 | Miller, Jr. | |
| 4,947,558 A * | 8/1990 | Cummins | 33/797 |
| 5,095,638 A | 3/1992 | David et al. | |
| 5,148,612 A | 9/1992 | Walser et al. | |
| 5,177,874 A * | 1/1993 | Ogorek | 33/794 |
| D332,921 S | 2/1993 | Victor, Sr. | |
| 5,249,366 A | 10/1993 | Takahashi et al. | |
| 5,363,562 A | 11/1994 | Schmidt | |
| 5,440,501 A | 8/1995 | Shimomura et al. | |
| 5,548,903 A | 8/1996 | Johnson et al. | |
| 6,145,207 A | 11/2000 | Brunson | |
| 6,205,672 B1 | 3/2001 | Paulsen et al. | |
| 6,223,136 B1 * | 4/2001 | Geiger | 702/158 |
| 6,279,248 B1 * | 8/2001 | Walters | 33/784 |
| 6,508,012 B2 | 1/2003 | Wells, Jr. | |
| 7,013,763 B2 * | 3/2006 | Hsien | 81/165 |
| 7,246,450 B1 * | 7/2007 | Mason | 33/784 |
| 2004/0003683 A1 * | 1/2004 | Rudduck | 81/52 |
| 2007/0157484 A1 * | 7/2007 | Grubler | 33/679.1 |

* cited by examiner

*Primary Examiner*—G. Bradley Bennett
*Assistant Examiner*—Amy Cohen Johnson
(74) *Attorney, Agent, or Firm*—Walter K. Roloff

(57) ABSTRACT

A device and method for rapid hardware sizing includes a ruler-like body having a fixed end and a distal end, a fixed jaw at the fixed end, and a sliding jaw opposite the fixed jaw being slidably connected to the body such that the sliding jaw slides there along from a point immediately adjacent to the fixed jaw to the distal end. A digital logic calculation and display means is secured to the sliding jaw such that it moves along the body with the sliding jaw. A measuring means is in communication with the digital logic calculation and display means, and measures a distance between the fixed and sliding jaws. The distance is then communicated to the digital logic calculation and display means and selectively displayed thereon.

4 Claims, 4 Drawing Sheets

DEVICE AND METHOD FOR RAPID HARDWARE SIZING

FIELD OF THE INVENTION

The present invention relates generally to devices and methods for determining the sizes of objects. The invention relates specifically to a device and method for rapid hardware sizing.

BACKGROUND OF THE INVENTION

Devices and methods for sizing hardware are well known. As used here throughout, the term "hardware" includes but is not limited to fasteners, such as nuts and bolts, and all other objects that have traditionally required measurements such as, for example, those requiring determination of widths, diameters, or spans. As such, "hardware" includes not only objects from the mechanical arts, but from other arts as well (e.g., medical, gemological, etc.).

Well known hardware sizing devices include calipers, and in recent years digital calipers such as those exemplified by U.S. Pat. No. 4,229,883 to Kobashi, U.S. Pat. No. 5,148,612 to Walser et al., U.S. Pat. No. 5,249,366 to Takahashi et al., U.S. Pat. No. 5,440,501 to Shimomura et al. (directed to electronics for use in a digital caliper), U.S. Pat. No. 6,508,012 to Wells, Jr., and U.S. Pat. No. Des. 332,921 to Victor, Sr.

However, these devices have heretofore not been able to rapidly and automatically discriminate between metric and inch (or, "British") measurement systems. Thus, despite past efforts, there has not been a device and method for rapid hardware sizing that selectively operates to provide a user with both (i) traditional digital caliper measurements and (ii) automatic discrimination between metric and British units of measurements when sizing a nut.

SUMMARY OF THE INVENTION

An object of the present invention is to provide a device and method for rapid hardware sizing that rapidly and automatically discriminates between metric and British measurements.

Another object of the present invention is to provide a device and method for rapid hardware sizing that selectively operates to provide a user with both traditional digital caliper measurements and automatic discrimination between metric and British units of measurements when sizing a nut.

In accordance with basic aspects of the present invention, a device for rapid hardware sizing includes a ruler-like body having a fixed end and a distal end, a fixed jaw at the fixed end, and a sliding jaw opposite the fixed jaw being slidably connected to the body such that the sliding jaw slides therealong from a point immediately adjacent to the fixed jaw to the distal end. A digital logic calculation and display means is secured to the sliding jaw such that it moves along the body with the sliding jaw. A measuring means is in communication with the digital logic calculation and display means, and measures a distance between the fixed and sliding jaws. The distance is then communicated to the digital logic calculation and display means and selectively displayed thereon.

Also in accordance with basic aspects of the present invention, a method for rapid hardware sizing includes steps of measuring a distance between fixed and sliding jaws, communicating the distance to a digital logic calculation and display means to enable it to automatically calculate and display the distance as a caliper measurement or a nut size, selectively changing between metric and British units of measurement, and displaying the distance with an indication of the corresponding selections from caliper measurement and nut size, and from metric and British units of measurement.

BRIEF DESCRIPTION OF THE DRAWINGS

The present invention is illustrated by way of example and not limitation in the Figures of the accompanying drawings in which.

DETAILED DESCRIPTION OF THE INVENTION

Figure 1:
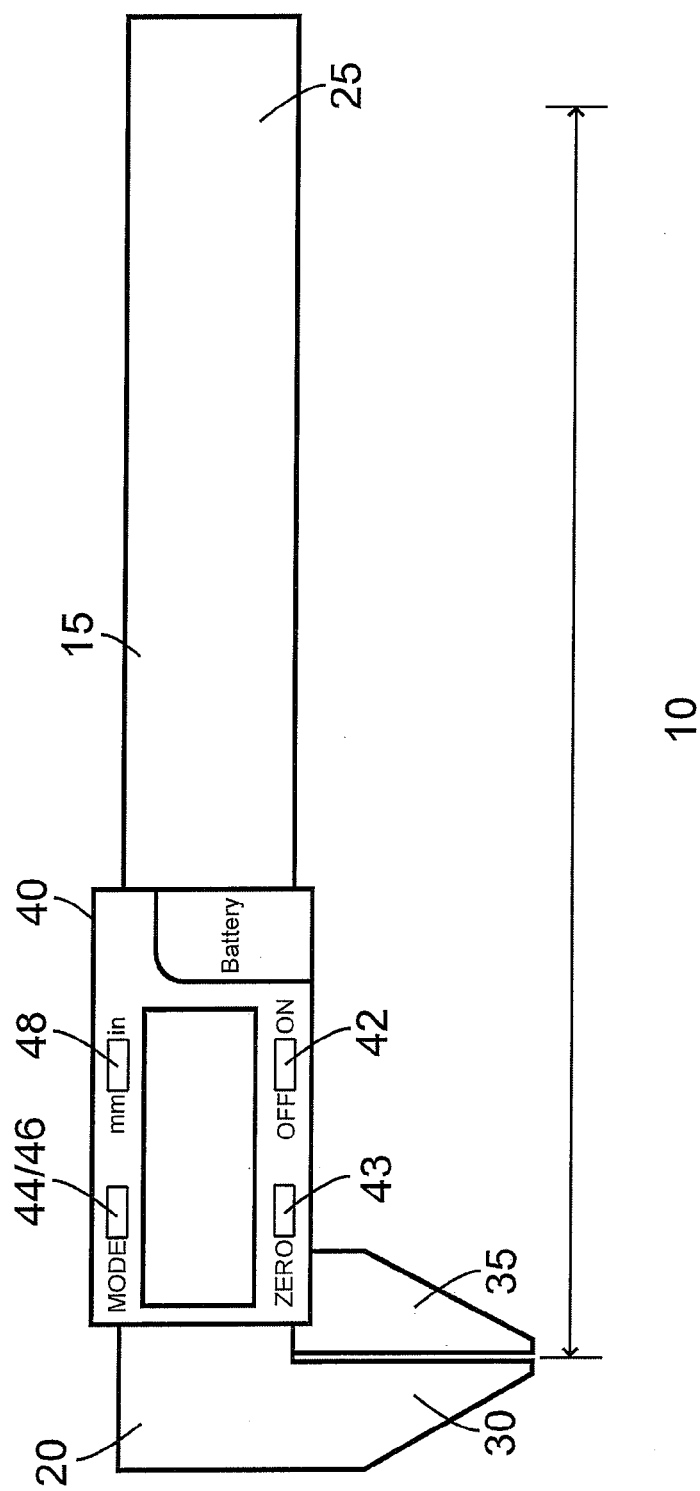
FIG. 1 is a plan view of an exemplary device for rapid hardware sizing constructed in accordance with the present invention.

As shown in FIG. 1, exemplary device for rapid hardware sizing 10 includes a ruler-like body 15 having a fixed end 20 and a distal end 25. A fixed jaw 30 is permanently secured to body 15 at fixed end 20. A sliding jaw 35 is slidably connected to body 15 opposite fixed jaw 30, such that sliding jaw 35 may be manipulated by a user to slide linearly along body 15 from a point immediately adjacent to fixed jaw 30 at fixed end 20, to a proximity of distal end 25. A digital logic calculation and display means 40 is secured to sliding jaw 35, thereby being capable of moving linearly along ruler-like body 15 with sliding jaw 35.

A measuring means (not illustrated) is contained within, and is in communication with, digital logic calculation and display means 40. The measuring means within means 40 functions to continuously measure distances between fixed jaw 30 and sliding jaw 35 when device 10 is in use, and to then communicate a distance between fixed jaw 30 and sliding jaw 35 to display means 40; that distance is then selectively displayed thereon as will be further described.

In addition to the measuring means, digital logic calculation and display means 40 includes buttons corresponding to (i) an ON/OFF means 42, (ii) a zero mode means 43, (iii) a combined caliper selection means 44 for a caliper mode, and nut sizing selection means 46 for a nut sizing mode, and (iv) a unit of measurement display selection means 48. ON/OFF means 42 operates in conventional fashion to alternatively energize ("turn on") and de-energize ("turn off") means 40. Zero mode means 43 enables a user to designate a desired position of sliding jaw 35 as zero (i.e., 0.00 mm or 0 in.). Combined caliper selection means 44 and nut sizing selection means 46 enables digital logic calculation and display means 40 to selectively and automatically calculate and display a distance between jaws 30 and 35 as either a caliper measurement or a nut size, as will also be further described. Means 40 also includes an electronic look-up table (not illustrated) for automatically discriminating between metric and British units as will be further described in operation of device 10. Finally, unit of measurement display selection means 48 displays both caliper measurements and nut sizes in, selectively, metric (mm) and British (in.) units of measurement as desired by a user. In particular, in the nut sizing mode, means 40 automatically calculates or discriminates between nut sizes by means of the look-up table. The look-up table preferably comprises a very exhaustive list of incremental sizes up to 1.5 in. Of course, the look-up table and its corresponding lists of sizes could comprise a larger or smaller range of values, depending upon a desired use and embodiment of device 10. The size thus determined is then instantly displayed in either metric or British according to a correct expression of that size as determined by means 40.

Means 40, in a preferred embodiment of device 10, would cover the following exemplary specifications having:
  ambient operating temperature capability from −20 C. to +70 C., and ambient relative humidity operating capability of less than 80%;
  a 3V power supply or battery ("BATT." in the drawings) and a working current of less than 30 microamperes;
  a display range of greater than 3 in. (75 mm);
  a resolution of 0.01 mm (0.0005 in.);
  a measurement precision of +/−0.03 mm (+/−0.001 in.); and
  the following look-up table entries:
    for metric (mm): 4, 4.5, 5, 5.5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, and 38; and
    for British (in.): 1/8, 5/32, 3/16, 7/32, 1/4, 9/32, 5/16, 11/32, 3/8, 7/16, 1/2, 9/16, 5/8, 11/16, 3/4, 13/16, 7/8, 1, 1 1/16, 1 1/8, 1 3/16, 1 1/4, 1 5/16, 1 3/8, 1 7/16, and 1 1/2.

Figure 1A:
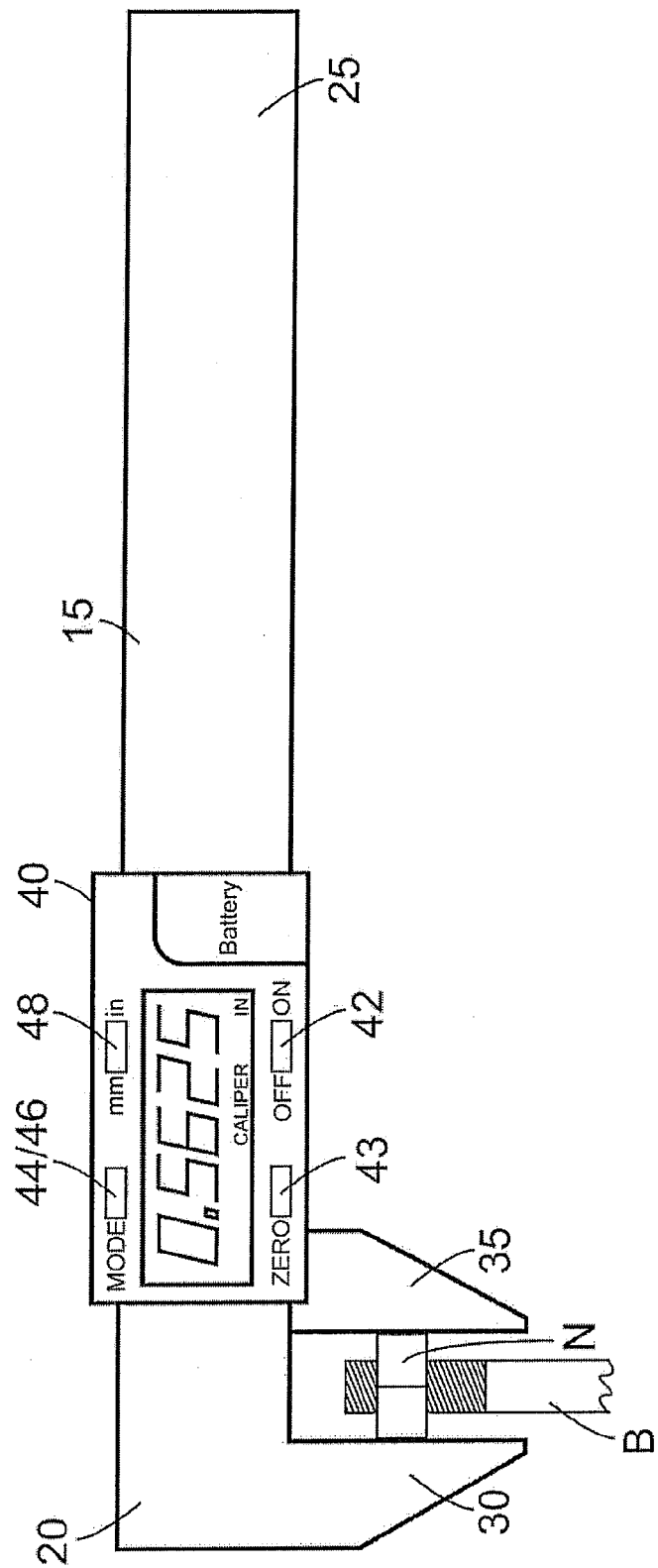
FIG. 1a is an illustration of the exemplary device of the present invention, shown in use and in a default mode.

In FIG. 1*a*, exemplary device 10 is depicted as being in use with a nut N on a bolt B. Therein, sliding jaw 35 was moved by the user to securely encompass nut N in caliper-like fashion, and ON/OFF means 42 was pressed to turn on means 40. Thereupon, the measuring means within digital logic calculation and display means 40 measures a distance between fixed jaw 30 and sliding jaw 35, with such distance then being selectively and automatically calculated and displayed as a default caliper measurement as shown, from a calculated spread between jaws 30 and 35 of 0.5625 in.; thus, that widthwise dimension of nut N is indicated on means 40.

Figure 1B:
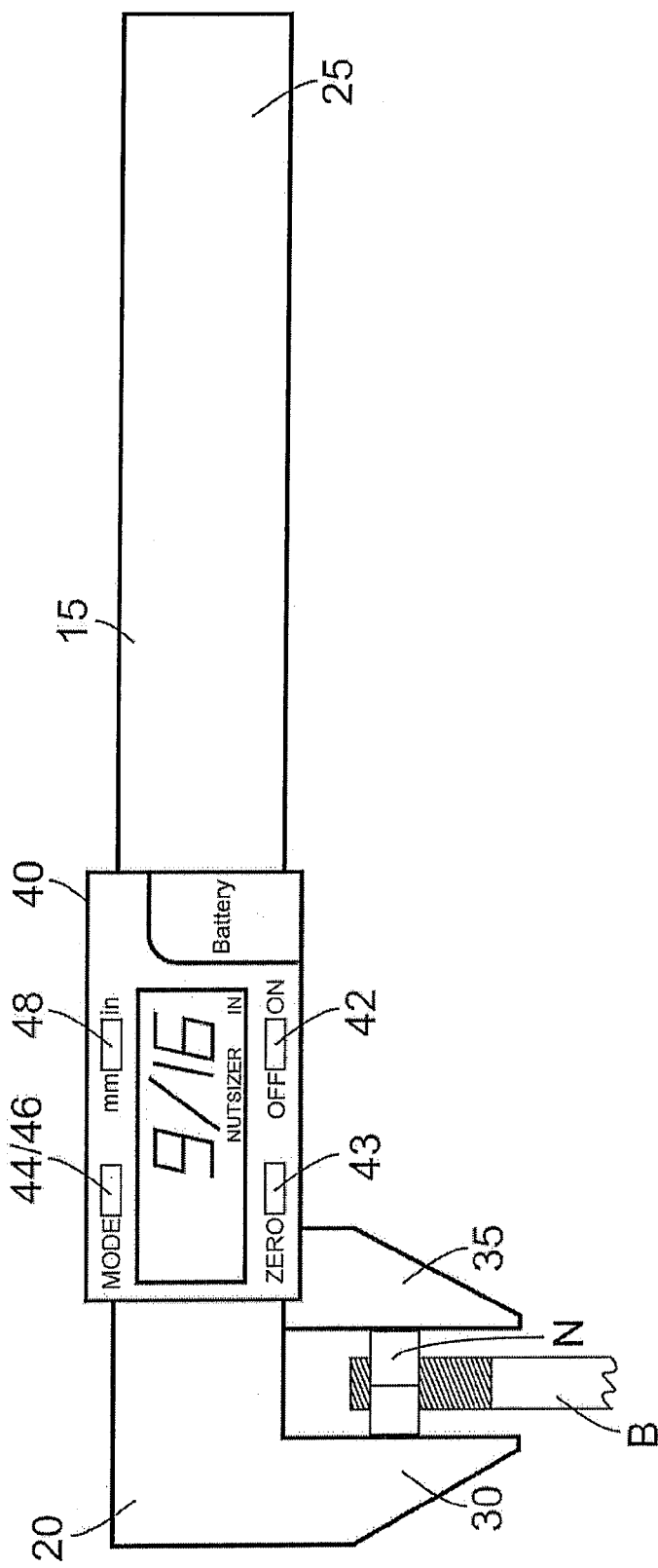
FIG. 1b is an illustration of the exemplary device of the present invention, shown in use and in an alternate mode.

In FIG. 1*b*, exemplary device 10 of FIG. 1*a* is depicted as being in use; and the button of combined caliper selection means 44 and nut sizing selection means 46 has been depressed to enter the nut size selection mode (i.e., in the drawing, the "NUTSIZER" mode). In this mode, digital logic calculation and display means 40 and the electronic look-up table enable device 10 to selectively and automatically calculate and display the distance betweens jaws 30 and 35 as a nut size. In FIG. 1*b*, in "NUTSIZER" mode, the 0.5625 in. measurement from the caliper mode of FIG. 1*a* has been automatically calculated by means 40 as a nut size of 9/16 in. The nut size may be, as desired in a particular embodiment of device 10, displayed in the same nomenclature as a tool (e.g., a wrench or socket) size (e.g., 5/8 in. or 8 mm) rather than in decimal form (e.g., respectively, 0.6250 in. or 8.00 mm).

It is to be appreciated and understood that in the nut sizing mode, nut sizing selection means with digital logic calculation and display means 40 automatically discriminates between metric and British units of measurement relative to the distance between jaws 30 and 35, and automatically calculates and displays a correct tool size in either metric or British units of measurement as automatically discriminated by means 40 for tightening or loosening ("manipulating") the nut.

It is also to be understood that the user may, at any desired time in the caliper mode, depress the button corresponding to unit of measurement display selection means 48 to thereby change or "toggle" between metric (mm) and British (in.) units of measurement; such "toggling" between units would display equivalency of distance (or most nearly so) between jaws 30 and 35 as expressed in one unit of measurement or the other. Also, the look-up table within digital logic calculation and display means 40 contains only discrete entries, which therefore allows the nut sizing mode to correctly display all tool sizes automatically. Thus in the nut sizing mode, the user does not "toggle" between the two units of measurement.

Figure 2:
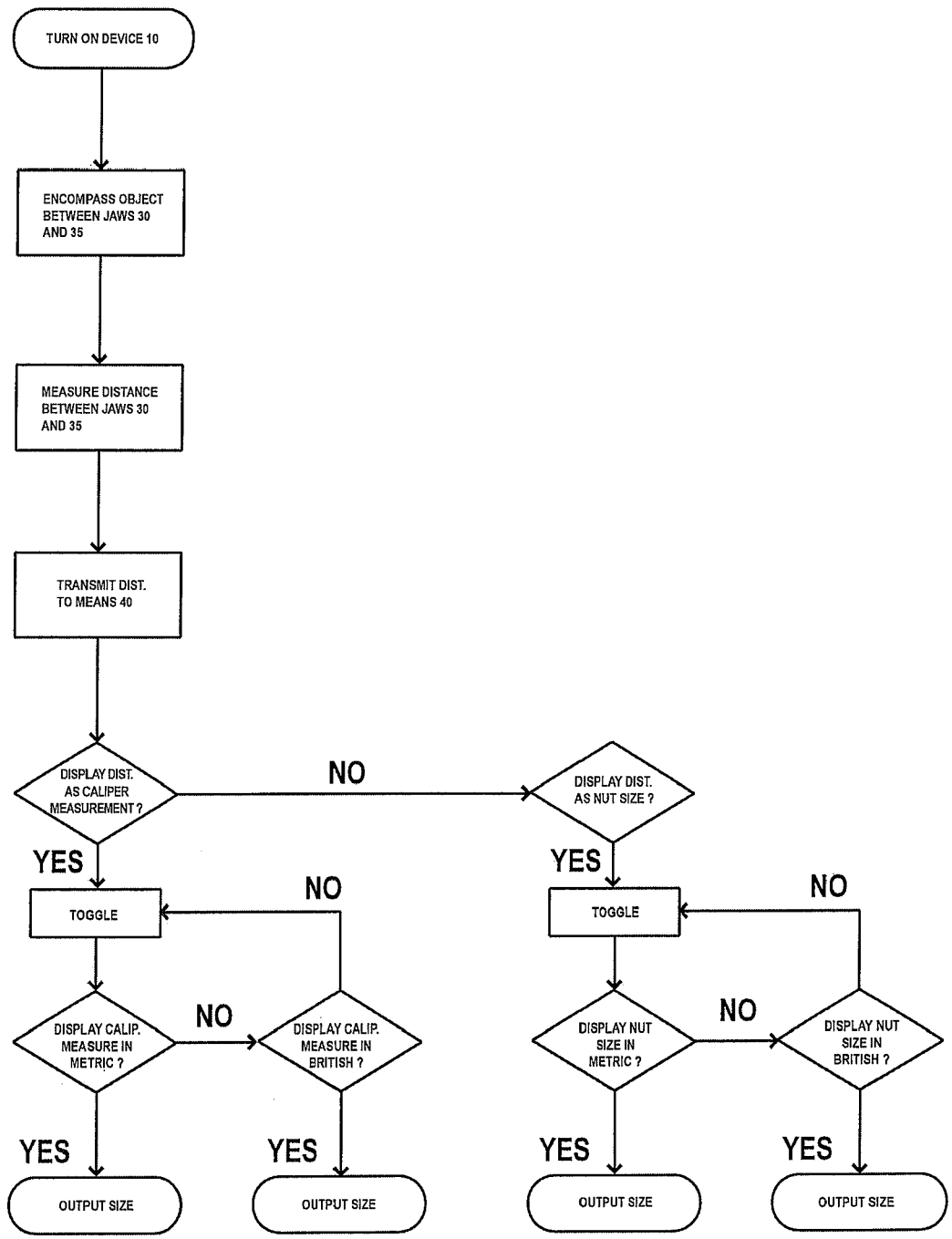
FIG. 2 is a flow diagram of a method for rapid hardware sizing, in accordance with the present invention.

Turning, now, to FIG. 2, a method for rapid hardware sizing of the present invention will be outlined. First, device 10 is provided to a user and energized, whereupon an object of interest (e.g., nut N in FIGS. 1*a-b*) is placed between jaws 30 and 35. Jaw 35 is then closed against the object such that jaws 30 and 35 securely encompass it in caliper-like fashion, whereupon the measuring means within digital logic calculation and display means 40 measures a distance between them. This distance is electronically communicated or otherwise transmitted to digital logic calculation and display means 40. Means 40 then selectively and automatically calculates and displays the distance as either a caliper measurement or a nut size. The user may then, as desired, toggle between metric and British readouts as displayed on means 40. In this way, it will be appreciated, rapid hardware sizing may be achieved in a heretofore unknown method by way of novel device 10.

It is to be appreciated and understood that the aforedescribed method of the present invention may be carried out with any suitable sizing device having features or attributes that are sufficiently similar to exemplary device 10 described herein.

With particular regard to exemplary device 10, it is to be appreciated that in its nut sizing mode (and only in this mode) device 10 will automatically discriminate between metric and British units, and output the corresponding size on means 40.

It is to be further appreciated that the present invention provides a device and method for rapid hardware sizing that has similarity in use to well known digital calipers and is thus "user friendly".

It is to be additionally appreciated and understood that the device and method of the present invention each advantageously permit a user, particularly when sizing a nut, to rapidly, accurately, and virtually effortlessly determine its size without resorting to the often frustrating and time consuming trial-and-error process of searching a tool box for a complementarily sized wrench.

While the present invention has been particularly shown and described with reference to the accompanying figures and specification, it will be understood however that other modifications thereto are of course possible; and all of which are intended to be within the true spirit and scope of the present invention.

It should be appreciated that components, dimensions, and other particulars and parameters of exemplary embodiments and methods of the invention aforedescribed may be substituted for others as desired or which are suitable for achieving desired results, or that various accessories may be added thereto.

It is also to be understood in general that any suitable alternatives may be employed to provide the device and method for rapid hardware sizing of the present invention.

Lastly, of course, the choice of compositions, sizes, and strengths of various aforementioned elements of the present invention are all a matter of design choice depending upon intended uses thereof. Accordingly, these and other various changes or modifications in form and detail of the present invention may also be made therein, again without departing from the true spirit and scope of the invention as defined by the appended claims.

What is claimed is:

1. A device for rapid hardware sizing, comprising:
    a ruler-like body having a fixed end and a distal end, and including (i) a fixed jaw at said fixed end and (ii) a sliding jaw opposite said fixed jaw, said sliding jaw being slidably connected to said ruler-like body such that said sliding jaw slides there along from a point immediately adjacent to said fixed jaw at said fixed end, to a proximity of said distal end;
    a digital logic calculation and display means secured to said sliding jaw of said ruler-like body, such that said digital logic calculation and display means moves along said ruler-like body with said sliding jaw;
    measuring means in communication with said digital logic calculation and display means, for measuring a distance between said fixed jaw and said sliding jaw, whereupon said distance is then electronically communicated to said digital logic calculation and display means and selectively displayed thereon; and
    an electronic nut sizing selection means with said digital logic calculation and display means, to enable said digital logic calculation and display means to (i) automatically discriminate between metric and British units of measurement relative to said distance, and (ii) selectively and automatically calculate and display a correct tool size for manipulating the nut in one of said metric and British units of measurement as automatically discriminated by said digital logic calculation and display means.

2. The device for rapid hardware sizing of claim 1, further including a caliper selection means with said digital logic calculation and display means, to enable said digital logic calculation and display means to selectively and automatically calculate and display said distance as a caliper measurement.

3. The device for rapid hardware sizing of claim 2, further including a unit of measurement display selection means for displaying said caliper measurement in, selectively, metric and British units of measurement.

4. A method for rapid hardware sizing, comprising:
    providing a device for rapid hardware sizing, said device including a fixed jaw, a sliding jaw opposite said fixed jaw, an electronic digital logic calculation and display means, and an electronic measuring means in communication with said digital logic calculation and display means;
    measuring a distance between said fixed jaw and said sliding jaw;
    electronically communicating said distance to said digital logic calculation and display means;
    enabling said digital logic calculation and display means to (i) selectively and automatically calculate and display electronically said distance as one selected from the group consisting of (a) a caliper measurement and (b) a nut size, and (ii) selectively and electronically change between units of measurement selected from the group consisiting of (a) metric and (b) British; and
    selectively displaying said distance electronically on said digital logic calculation and display means, with an indication of the corresponding selections from (i) caliper measurement and nut size, and (ii) metric and British units of measurement.

* * * * *